United States Patent [19]

Beaujean et al.

[11] Patent Number: 4,493,434
[45] Date of Patent: Jan. 15, 1985

[54] VALVE SYSTEM FOR PRESSURIZED VESSELS

[75] Inventors: Holger Beaujean, Karlsruhe-Durlach; Willi Kamphausen, Erkelenz; Dieter Niephaus, Jülich; Ove Nommensen, Aachen, all of Fed. Rep. of Germany

[73] Assignee: Kernforschungsanlage Jülich GmbH, Jülich, Fed. Rep. of Germany

[21] Appl. No.: 472,061

[22] Filed: Mar. 4, 1983

Related U.S. Application Data

[63] Continuation of Ser. No. 227,768, Jan. 23, 1981, abandoned.

[30] Foreign Application Priority Data

Jan. 26, 1980 [DE] Fed. Rep. of Germany ....... 3002768

[51] Int. Cl.³ ............................................. F17C 13/04
[52] U.S. Cl. ................................. 222/3; 137/630.14; 222/506
[58] Field of Search ...................... 222/3, 506, 402.16, 222/402.2; 137/630.14, 630.15; 141/3, 20

[56] References Cited

U.S. PATENT DOCUMENTS

| | | | |
|---|---|---|---|
| 1,306,150 | 6/1919 | Kessler | 222/506 X |
| 2,265,496 | 12/1941 | Shaw | 137/630.15 X |
| 3,648,893 | 3/1972 | Whiting | 222/3 |
| 3,930,517 | 1/1976 | Gagala | 222/3 X |

FOREIGN PATENT DOCUMENTS

| | | |
|---|---|---|
| 803872 | 4/1951 | Fed. Rep. of Germany . |
| 829844 | 1/1952 | Fed. Rep. of Germany . |
| 1196915 | 7/1965 | Fed. Rep. of Germany . |
| 2523202 | 12/1976 | Fed. Rep. of Germany . |
| 2623039 | 12/1977 | Fed. Rep. of Germany . |
| 1235562 | 5/1960 | France . |
| 2359342 | 2/1978 | France . |

*Primary Examiner*—F. J. Bartuska
*Attorney, Agent, or Firm*—Karl F. Ross

[57] ABSTRACT

A valve for a pressure bottle or vessel adapted to contain a dangerous fluid, such as a radioactive gas, can comprise two valve members in tandem which require actuation by separate operating members thereby eliminating the possibility for accidental or inadvertent opening. The main valve housing can be provided with a pressure equalization valve which opens when the bottle is immersed in a body of water at elevated water pressures to equalize the interior and exterior pressures while providing a water seal against escape of the bottle contents.

18 Claims, 8 Drawing Figures

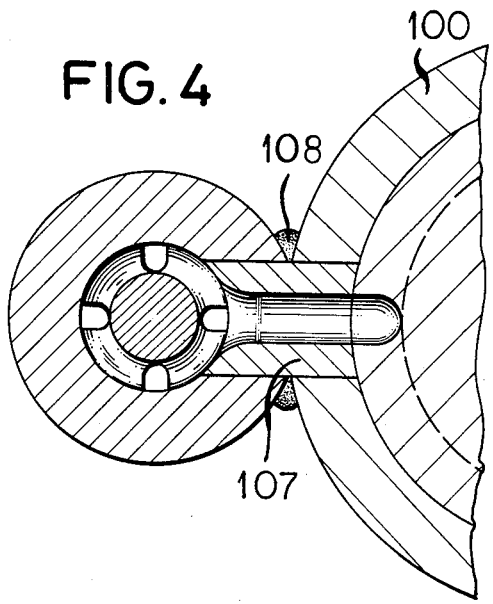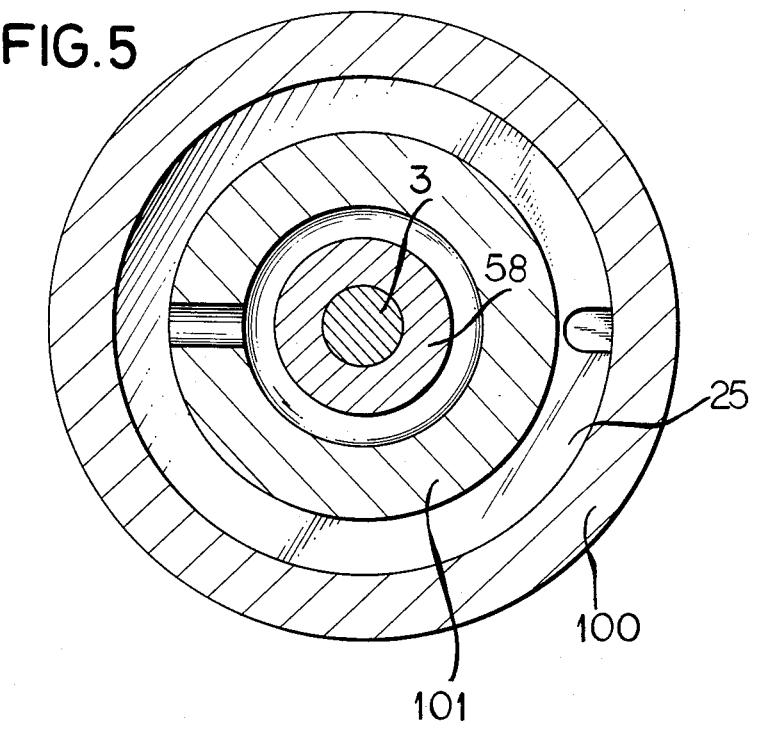

4,493,434

VALVE SYSTEM FOR PRESSURIZED VESSELS

CROSS REFERENCE TO RELATED APPLICATION

This application is a continuation of Ser. No. 227,768, filed Jan. 23, 1981 and now abandoned.

FIELD OF THE INVENTION

Our present invention relates to a valve system for pressurized vessels and, more particularly, to a pressure-retentive valve arrangement for gas-containing bottles and especially for bottles, flasks and like vessels containing dangerous, e.g. radioactive or toxic, gases.

BACKGROUND OF THE INVENTION

It is a common practice to provide a pressure-retentive vessel such as a so-called "bottle" for gases under pressure, generally composed of steel of a wall thickness adapted to sustain many times the internal pressure of the stored gas, with a pressure-retentive valve through which filling of the bottle and controlled discharge of the bottle contents can be effected.

To this end, an elongated valve housing may be affixed to the neck of the bottle and can be provided with a valve spindle controlled by an actuating member, e.g. a screw or the like, so that the valve member, which is held closed by the internal pressure, can be displaced from the valve seat to allow filling or emptying.

In conventional valve systems of this type it is possible by tilting the vessel or otherwise handling it improperly, to dislodge the valve member from the seat and allow inadvertent release of the contents.

This is impermissible for the storage, supply, transport and handling of dangerous, especially highly radioactive liquids and gases.

OBJECTS OF THE INVENTION

It is thus the principal object of the present invention to provide a more reliable valve system whereby the disadvantages of earlier valve arrangements are obviated.

Another object of this invention is to provide a valve system, especially for flasks and bottles containing highly radioactive gases under pressure, whereby the inadvertent discharge of the flask contents is practically precluded.

Yet another object of the invention is to provide an improved valve system facilitating the deep-sea disposal of flasks and bottles containing highly radioactive gases safely.

SUMMARY OF THE INVENTION

These objects and others which will become more readily apparent hereinafter are attained, in accordance with this invention, in a pressure-retentive valve system wherein the valve housing comprises an inner valve member and an outer valve member, i.e. two valves in tandem, each engaging a respective seat and wherein the inner valve member, i.e. the valve member proximal to the contents of the bottle, is spring-biased by a prestressed spring against its seat and has a spindle which is engageable with lost motion by the outer valve member, each of the valve members being provided with the respective actuating member operable externally of the valve housing and including a nut or the like so that the closing of the inner valve is independent of the closing of the outer valve.

According to the invention, the outer valve must first be opened by operating its spindle drive before the inner valve is displaceable by its external drive which entrains the spindle drive of the outer valve member. The drive for the outer valve thus takes up the lost motion of the inner valve member before the actuator for the latter becomes effective.

Since a significant operation of the two actuators is required to open the valve system, inadvertent opening is practically precluded.

The actuator for the up and down movement of the outer valve member can thus have a pair of abutments whereby it is entrained by a briding member displaceable by the actuator for the inner valve member.

The spindle or shank of the outer valve is preferably sealed by a bellows against the ambient pressure.

According to yet another feature of the invention, the shank of the inner valve member has an end guided within the valve plate of the outer valve member, and defining the lost motion of the inner valve member relative to the outer valve member between abutment surfaces at the end of the shank of the inner valve member and the bottom of the guide passage. This lost motion can correspond to 10% of the total stroke of the two actuators for the full opening of the valve after the outer valve member has been fully opened.

According to yet another feature of the invention, the passage beyond the valve seat of the outer valve member communicates with a lateral fitting provided with a check valve and serving to connect the central chamber of the main valve housing with a source of fluid from which the bottle is to be charged or with a consumer of the fluid. The free space between the inner and outer valves within the main valve housing is calibrated to receive a precise volume of gas for sampling through this fitting.

The valve system of the present invention can also be provided with a pressure-equalizing valve which facilitates the deep-sea storage or disposal of dangerous gases or liquid, for example, highly radioactive krypton.

In this case the housing is provided between the inner and outer valve seats with a spring-loaded check valve communicating with the exterior and serving as a pressure-equalizing valve.

When the bottle is lowered into a body of water, the external pressure can exceed the threshold pressure of the spring of this pressure-equalizing valve and allow water to pass into the interior.

The flow passage between the check valve and the valve housing should be dimensioned in accordance with the rate of descent of the bottle in the body of water so that the influx of water is not excessive but yet is sufficient to prevent a pressure differential from developing across the wall of the bottle which may cause implosion.

According to another feature of the invention, this passage has at least two changes in direction and forms effectively a labyrinth which communicates with the surroundings at a point, when the bottle is upright, below the highest point of this passage.

The passage can be in the form of a helix or can be formed by two interconnected annular grooves.

BRIEF DESCRIPTION OF THE DRAWING

The above and other objects, features and advantages of the present invention will become more readily apparent from the following description, reference being made to the accompanying drawing in which:

FIGS. 1A and 1B are sectional views of a safety cap and a connecting fitting for use with the valve of FIG. 1 respectively;

FIG. 4 is a horizontal section taken along the line IV—IV of FIG. 3; and

FIG. 5 is a horizontal section taken along the line V—V of FIG. 3.

SPECIFIC DESCRIPTION

Figure 1:
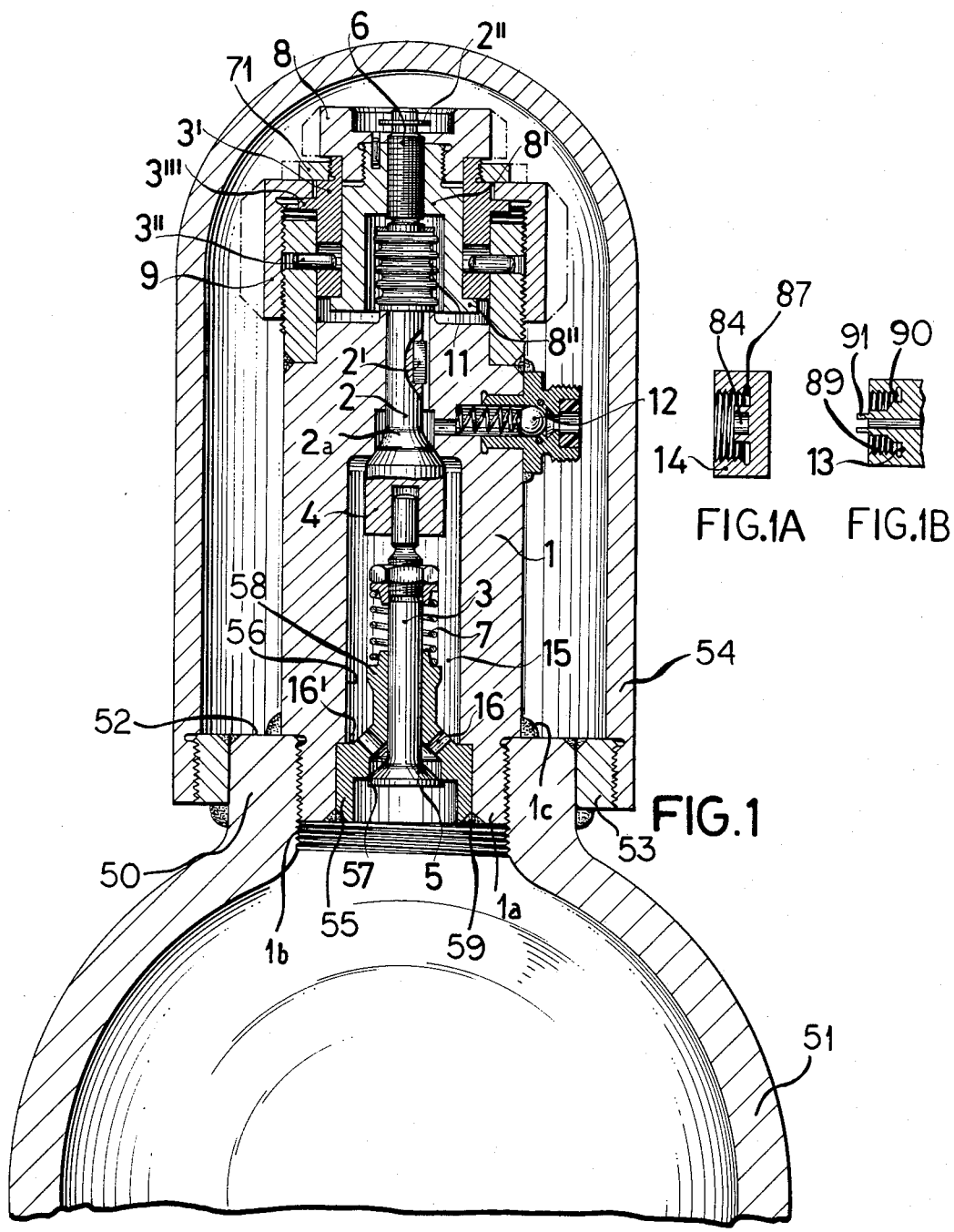
FIG. 1 is a vertical axial cross section through a valve in accordance with the present invention showing portions of the protective cap and the gas bottle or flask in which the valve is mounted.
Figure 2:
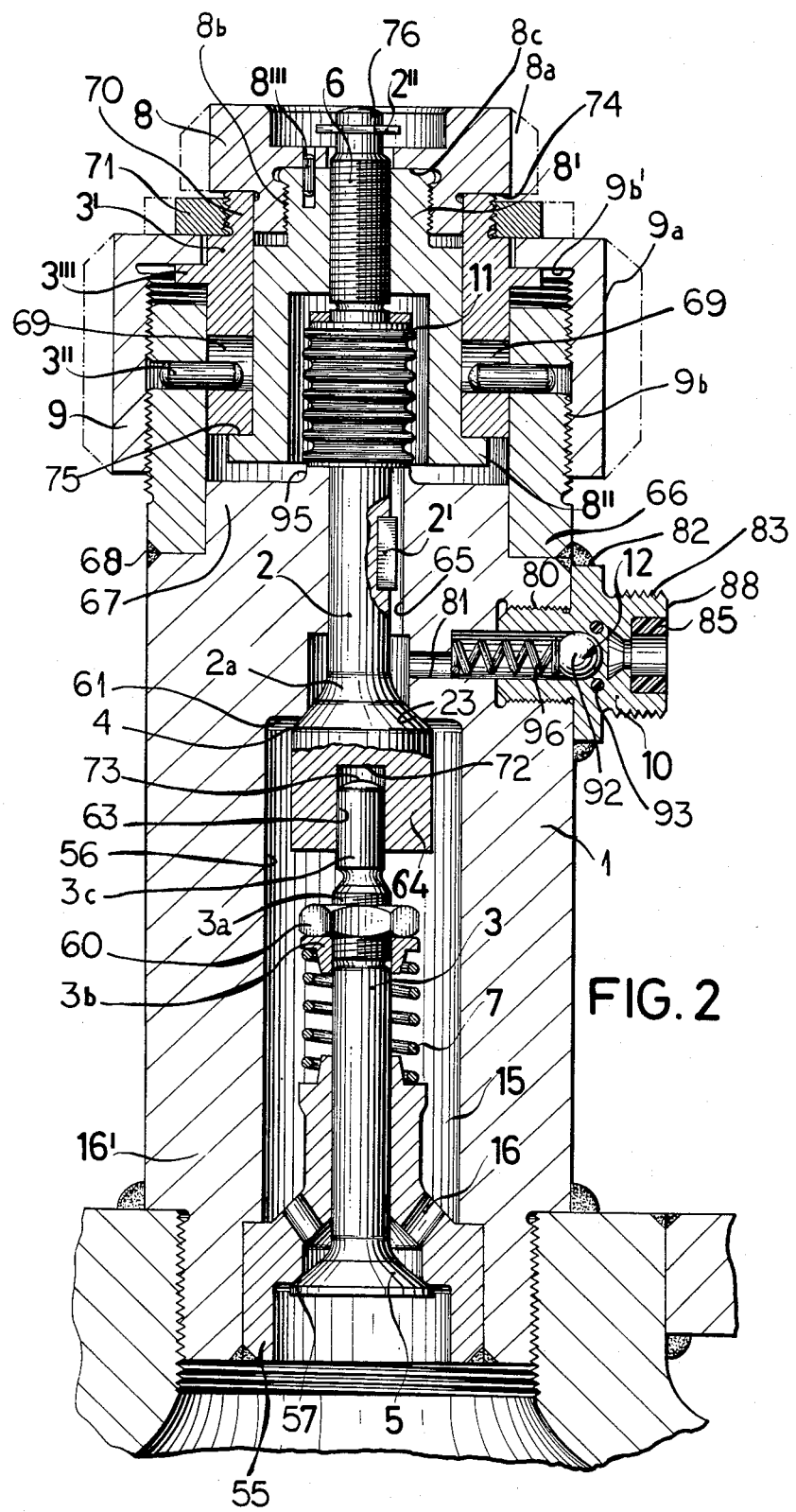
FIG. 2 is an axial cross sectional view, drawn to a larger scale, of the valve structure of FIG. 1.

As can be seen from FIGS. 1 and 2, a valve housing 1 can have its lower end 1a provided with an external screw thread 1b and threaded into the internal thread of the neck 50 of a steel cylinder 51 forming a pressure-retentive gas bottle for dangerous gases, e.g. radioactive or toxic gases. To secure the valve housing 1 in place, it is welded to the upper end 52 of the bottle 51 by a weld seal 1c.

The neck 50 of the bottle may have welded to it an externally threaded ring 53 onto which a protective cap 54 is threaded, the cap 54 serving to prevent damage to the valve structure in handling or in the event the bottle is tipped over in use, filling, storage or shipment.

The valve housing 1 comprises two valve members 2 and 3 in tandem, these valve members being of the poppet type with conical valve plates 4 and 5 respectively. The outermost or upper valve 2 is provided with a shank or stem 2a formed at its end with a threaded spindle while the inner valve 3 is pressed into a closed position by a prestressed helical-coil compression spring 7 surrounding its stem. The suspended arrangement of these valves has the advantage that, after a cryogenic filling of the bottle 51, the initial spring-applied sealing force is reinforced by the gas pressure developed in the bottle. Thus, a member 55 may be mounted in a stepped bore 56 of the valve housing 1 and can form a first valve seat 57 against which the valve plate 5 is pressed by this pressure and by the force of the spring 7 which is seated against a boss 58 of the member 55 which is sealed relative to the housing 1 by a weld seam 59. The prestress upon the spring 7 is adjustable by a nut 60 threaded onto a spindle-forming stem 3a and bearing against a washer 3b upon which the spring 7 reacts.

The stepped bore 56 is formed with a shoulder 61 forming a spring seat 23 for the valve member 2 which has, at the bottom part of its plate or head 64, a bore 63 in which an axially extending portion 3c of the valve member 3 is guided.

For opening and closing the two valves 2 and 3, we provide two nuts 8 and 9. The nut 8 is intended to actuate the outer valve 2 while the nut 9 actuates the inner valve 3.

As can be seen from FIG. 2, the shank 2a of the outer valve 2 receives a key 2' which extends into an axial groove 65 formed in the valve housing 1 and preventing rotation of the valve member 2 when the nut 8 which can have a milled periphery 8a is rotated.

The nut 8 has an internal thread 8b whereby it is affixed to a cylinder boss 8c of a sleeve 8' threadedly engaging the spindle 6, an axial pin 8''' preventing relative rotation of members 8 and 8' so that they act collectively for spindle actuation. The stroke of the valve 2 is about 3 mm.

The inner or lower valve member 3 is actuated, as indicated, by the nut 9 which likewise has a milled periphery at 9a and is threaded at 9b onto an externally collar 66 fitted over a step 67 of the housing 1 and welded thereto at a weld seam 68.

The inwardly directed shoulder 9b of the nut 9 engages an outwardly extending flange 3''' of a force-transmitting member 3' in the form of a sleeve surrounding the sleeve 8' and shiftable axially relative thereto. The sleeve 3' is held against rotation by pins 3'' which fit into axially extending slots 69 of the force-transmitting member or sleeve 3', the slots being of sufficient length to allow a stroke of about 3 mm. The sleeve 3' is formed with an externally threaded boss 70 onto which a further nut 71, in the form of counternut, can be screwed to lock the inwardly directed shoulder 9b between the flange 3''' and this counternut.

After a lost motion of about 0.5 mm, the valve member 2 with its surface 72, comes to bear upon the end 73 of member 3c so that further rotation of the nut will open the inner valve.

Thus, in operation, nut 8 is first actuated to open the outer valve whereupon nut 9 is rotated to displace both valve members 2 and 3 to the fully opened position by entrainment of member 3' in the downward direction via the flange 3''' and the concomitant displacement of the member 8, 8' in this direction via an outwardly extending flange 8'' on the latter.

For the valve closing movement, rotation of the nut 9 in the opposite sense entrains member 3' upwardly by pressing upon the counternut 71 so that the valve 3 first closes whereupon the valve 2 closes.

The thickness of the flange 9b reaching between flange 3''' and the nut 71 must thus be slightly smaller than the distance between these members to allow for rotation of the nut 9.

To allow for rotation of the nut 8, the distance between the lower surface 74 of this nut and the upper surface 75 and the flange 8'' must be slightly greater than the axial length of member 3'.

The downward movement of the spindle or valve member 2 relative to the nut assembly 8, 8' is limited by a stop ring 2'' which can be of the circlip type and can be lodged in an external groove at the end 76 of the shank 2a of valve member 2. The pins 3''' serve to limit the upward and downward movements of the entire valve actuating system.

When the two valves 2 and 3 are opened, the bottle can be filled or emptied via a lateral connecting fitting 10. To this end the fitting 10 has a threaded projection 80 which is screwed into an internally threaded radial bore in the housing 1 in line with a passage 81 and a weld seam 82 is applied to seal the fitting in place. The fitting 10 has an external thread 83 onto which a cap 14 may be fitted. (FIG. 1A) as an additional safety precaution, the cap 14 having an internal boss 84 adapted to rest against a sealing ring 85 recessed in a chamber 86 within the fitting 10. In addition, a layer of sealing material 87 may be provided in the cap 14 to abut the face 88 of this fitting.

For filling and emptying, the fitting 13 of FIG. 1B replaces the cap 14. This fitting 13 has an internal thread 89 which can screw onto the thread 83 so that the face 88 can engage the sealing material 90. In this case, however, the boss 91 is axially extended to press a check valve ball 92 away from its O-ring seat 93 while nevertheless engaging the sealing ring 85.

After the bottle has been filled and it has reached its equilibrium temperature, the calibrated space 15 contains a gas sample of the same composition as the contents of the bottle. By opening only the outer valve 2 via nut 8 and without actuation of the nut 9, this sample can be taken utilizing the fitting 13 which presses the ball 92 into its open position. A seal is provided as indicated between the fitting 13 and the fitting 10 so that gases from dead spaces do not interfere with the sampling.

Figures 3, 3A:
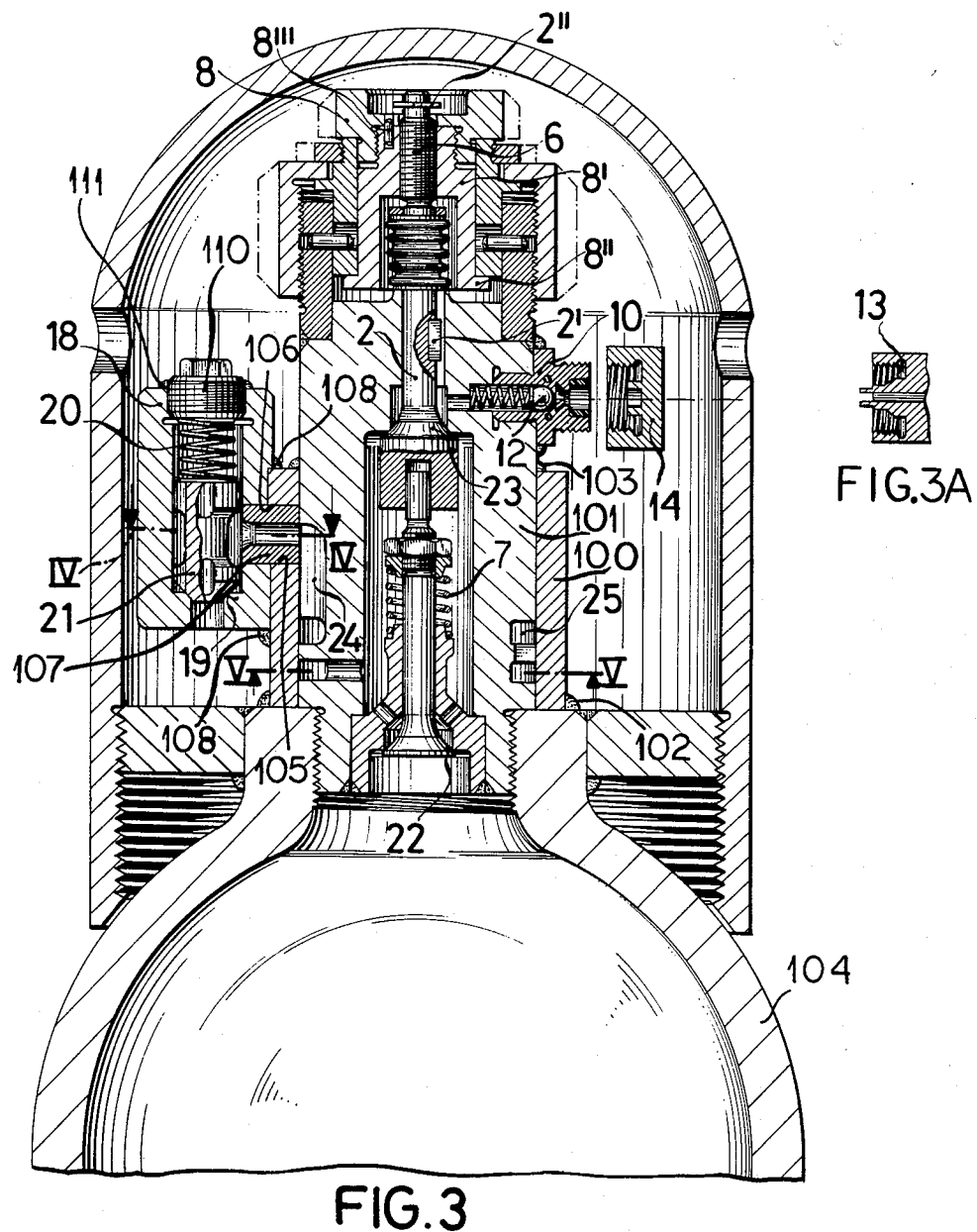
FIG. 3 is an axial section, partly in exploded form, illustrating a valve according to the invention provided with an additional pressure-compensating device.
FIG. 3A is a section through a connecting fitting for the valve of FIG. 3.

FIGS. 3 through 5 illustrate an arrangement which operates similarly to that of FIGS. 1 and 2 hence the same reference numerals are used to indicate equivalent elements. This valve however, has a compensating arrangement which makes use of a further valve housing 18 which is welded onto a sleeve 100 surrounding the housing 101 and sealed by weld seams 102 and 103 to the end of the bottle 104 and to the main valve housing 101 respectively. The sleeve 100 has a radial bore 105 which is aligned with a radial bore 106 of the valve housing 18, these bores being filled by a tubular sleeve 107. The housing 18, in turn, is welded sealingly at 108 to this sleeve 100.

The housing 18 receives a pressure-compensating valve and forms, for redundancy purposes, a labyrinth-type liquid seal blocking the escape of gas from the bottle 104 when the latter is stored or disposed of by deep-sea immersion.

The housing 18 forms a conical valve seat 19 against which the valve member 21 is pressed by a prestressed spring 20. The compression spring 20 can be seated against a plug 110 which is threaded into the housing 18 to adjust the prestress on the spring and then sealed by a weld bead 111.

Naturally, the cap 14 is customarily in place on the fitting 10 while the cover 54 protects the valve and the fitting 13 is applied only upon removal of the cover 54.

Since the strokes of the valve actuator and valve members are limited in the manner described, an opposing actuation of the nuts by operating on one of them is not possible, thereby ensuring reliable opening and closing operations.

To seal the valve member 2 against the surrounding atmosphere, the bellows 11 is provided, the lower end of the belows being welded or otherwise bonded to a boss 95 on the housing 1 while the upper end of the bellows sealingly engages the shank 2a of the upper valve member.

The ball check 92 forms part of a check valve assembly 12 which can correspond to German Industrial Standard DIN 477, Configuration E2. This check valve comprises a compression spring 96 which urges the ball 92 into its closed position.

The valve construction also permits the taking of a gas sample without complete opening of the bottle. To this end, the space 15 between the inner and outer valves 3 and 2 serves as a sample-containing space and can have a predetermimed volume of about 42 ml.

The member 55 is provided beyond the seat 57 with a plurality of throughgoing bores 16 which are disposed inwardly of the wall of bore 56 so that a collecting trough 16' is divided between the member 55 and the housing 1 in which liquid gas can collect during the cryogenic filling of the bottle.

The valve 21 is not manually operable and can only be opened by the application of an elevated pressure from the exterior.

The interiors of the two valve housings 1 and 18 are connected as described so that the valves 21 and 22 are in tandem while the valves 23 and 21 are in parallel, the valves 22 and 23 being in tandem as already described.

The opening and closing operations of the valves 22 and 23, the filling of the vessel, the sampling of the contents and the discharge of the vessel by the operation of valves 22 and 23 are effected in the manner described in connection with FIGS. 1 and 2, the cap 14 being replaced by the fitting 13 for the sampling and discharge operations.

The spring 20 is dimensioned so that the valve 21 can open at a pressure of about 15$b$, corresponding to a water depth of 150 m. When the bottle is immersed to this depth, the valve 21 opens and any residual gas within this valve is displaced by water which ultimately displaces the valve 22 against its spring and compresses the gas within the bottle 104.

Before the water flows into the main valve housing 1 from the auxiliary valve housing 18 it is deflected a number of times through the connecting passages 24, 25 forming the labyrinth seal (including the two annular groves shown in FIG. 5) between the valve housing 18 and the interior of the bottle. This seal serves to prevent escape of gas while the flask is at the bottom of the body of water in which it is immersed.

During lowering of the bottle, the passage is filled with water and forms a natural barrier to the escape of gas. The compression spring 7 of the valve 22 can also be dimensioned to open at a pressure differential of 15$b$ so that the valve 21 will open at, say, 150 m of immersion depth and valve 22 will open when the external water pressure exceeds the sum of the opening pressure of the valve 21 and the internal pressure within the bottle.

When the valve 22 opens, no gas can escape because it is a less dense medium than the water filling the labyrinth passages. In addition, the bottle sinks with the valve head downwardly thereby further excluding the possibility of gas escape.

Only when the bottle comes to rest on the bottom of the body of water is it possible for it to assume a position in which gas might escape but at this point pressure equalization is complete and the labyrinth passage is filled with water to prevent any outward discharge of the gas. In all positions of the bottle the aforementioned water barrier is provided.

We claim:

1. A pressure-retentive valve system for a vessel under a fluid pressure, said valve system comprising:
   a valve housing having a chamber communicating with the interior of said vessel and affixed thereto, said chamber being provided with an inner seat proximal to said vessel and an outer seat spaced from said inner seat;
   an inner valve member received in said chamber and engageable with said inner seat;
   a prestressed spring in said chamber bearing upon said inner member and urging same in the direction of said inner seat;
   an outer valve member in said chamber having a valve plate engageable with said outer seat, said inner valve member having a respective valve plate subjected to the pressure of fluid in said vessel and urged thereby against the respective seat;

a threaded element rotatable on said housing and threadedly connected to said outer valve member for displacing same toward and away from said outer seat, said inner valve member having a stem received in the valve plate of said outer valve member and forming an abutment therewith with lost motion between said valve members for opening of said inner valve member, said inner valve member being closed by said spring against said inner seat; and first and second actuators respectively for said outer and inner valve members acting upon said valve members through said element.

2. The system defined in claim 1 wherein said outer valve member has a stem projecting away from said vessel and sealingly connected with said housing by a bellows.

3. The system defined in claim 1 wherein said valve members are constructed and arranged to abut, upon full opening of said outer valve member by said first actuator, only upon a further displacement of said outer valve member by said second actuator corresponding to about 10% of the total displacement of the valve members by the two actuators.

4. The system defined in claim 1 wherein said housing is formed with a lateral fitting communicating with said chamber outwardly of said outer seat and provided with a spring-loaded check valve.

5. The system defined in claim 1 wherein the space in said chamber between said inner and outer seats is calibrated to provide a sampling volume.

6. The system defined in claim 1, further comprising a pressure equalizing spring-loaded check valve communicating with said chamber between said inner and outer seats.

7. A pressure-retentive valve system for a vessel under a fluid pressure, said valve system comprising:
a valve housing having a chamber communicating with the interior of said vessel and affixed thereto, said chamber being provided with an inner seat proximal to said vessel and an outer seat spaced from said inner seat;
an inner valve member received in said chamber and engageable with said inner seat;
a prestressed spring in said chamber bearing upon said inner member and urging same in the directed of said inner seat;
an outer valve member in said chamber engageable with said outer seat, said inner valve member having a respective valve plate subjected to the pressure of fluid in said vessel and urged thereby against the respective seat;
a first actuator rotatable on said housing and operatively connected to said first outer valve member for displacing same away from said outer seat;
a second actuator rotatable on said housing operatively connected to said inner valve member for displacing said inner seat, said inner valve member having a stem received in the valve plate of said outer valve member and forming an abutment therewith with lost motion between said valve members; and
a pressure equalizing spring-loaded check valve communicating with said chamber between said inner and outer seats, said check valve communicating with said chamber over a passage having at least two direction changes and said check valve communicating with the surroundings at a point below the highest point of said passage in an upright position of said chamber at the top of said vessel.

8. The system defined in claim 7 wherein said passage is generally helical or comprises two interconnected annular grooves.

9. The system defined in claim 7 wherein said passage is dimensioned in accordance with the descent velocity of said vessel in a body of water to ensure sufficiently rapid admission of water to said vessel through said check valve to prevent damage to the vessel wall.

10. The system defined in claim 7 wherein said outer valve member has a stem projecting away from said vessel and sealingly connected with said housing by a bellows.

11. The system defined in claim 7 wherein said valve members are constructed and arranged to abut, upon full opening of said outer valve member by said first actuator, only upon a further displacement of said outer valve member by said second actuator corresponding to about 10% of the total displacement of the valve members by the two actuators.

12. The system defined in claim 7 wherein said housing is formed with a lateral fitting communicating with said chamber outwardly of said outer seat and provided with a spring-loaded check valve.

13. The system defined in claim 7 wherein the space in said chamber between said inner and outer seats is calibrated to provide a sampling volume.

14. A pressure-retentive valve system for a vessel under a fluid pressure, said valve system comprising:
a valve housing having a chamber communicating with the interior of said vessel and affixed thereto, said chamber being provided with an inner seat proximal to said vessel and an outer seat spaced from said inner seat;
an inner valve member received in said chamber and engageable with said inner seat;
a prestressed spring in said chamber bearing upon said inner member and urging same in the direction of said inner seat;
an outer valve member in said chamber engaeable with said outer seat, said inner valve member having a respective valve plate subjected to the pressure of fluid in said vessel and urged thereby against the respective seat;
a first actuator rotatable on said housing and operatively connected to said outer valve member for displacing same away from said outer seat; and
a second actuator rotatable on said housing operatively connected to said inner valve member for displacing said inner seat, said inner valve member having a stem received in the valve plate of said outer valve member and forming an abutment therewith with lost motion between said valve members, each of said valve members has formed as a poppet valve body having a conical surface engageable with the respective seat and formed on the respective plate and with a respective stem extending axially from the respective plate, said spring surrounding said stem of said inner valve member and bearing upon a nut threaded onto said stem of said inner valve member while engaging a seat connected with said housing and formed on an axial boss surrounding said stem of said inner valve member, said stem having an extension beyond said nut received in an axial bore formed in said plate of said outer valve member, said outer valve member having a threaded portion on its stem remote from its valve plate, said first actuator including a threaded sleeve axially connected to but rotatable relative to the threaded sleeve of said first actuator said housing having a threaded portion by the threaded sleeve of said second actuator.

15. The system defined in claim 14 wherein said outer valve member has a stem projecting away from said vessel and sealingly connected with said housing by bellows.

16. The system defined in claim 14 wherein said valve members are constructed and arranged to abut, upon full opening of said outer valve member by said first actuator, only upon a further displacement of said outer valve member by said second actuator corresponding to about 10% of the total displacement of the valve members by the two actuators.

17. The system defined in claim 14 wherein said housing is formed with a lateral fitting communicating with said chamber outwardly of said outer seat and provided with a spring-loaded check valve.

18. The system defined in claim 14 wherein the space in said chamber between said inner and outer seats is calibrated to provide a sampling volume.

* * * * *